(12) United States Patent
Rao et al.

(10) Patent No.: US 9,525,992 B2
(45) Date of Patent: Dec. 20, 2016

(54) WIRELESS SYSTEM SELECTION BASED ON DATA CONNECTIVITY

(75) Inventors: Bharath Narasimha Rao, San Jose, CA (US); Karthik Anantharaman, Cupertino, CA (US); Madhusudan Chaudhary, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 942 days.

(21) Appl. No.: 13/153,253

(22) Filed: Jun. 3, 2011

(65) Prior Publication Data

US 2012/0309397 A1 Dec. 6, 2012

(51) Int. Cl.
*H04W 4/00* (2009.01)
*H04W 8/00* (2009.01)
*H04W 36/00* (2009.01)

(52) U.S. Cl.
CPC ............. *H04W 8/00* (2013.01); *H04W 36/00* (2013.01)

(58) Field of Classification Search
CPC .............................. H04W 60/00; H04W 36/00
USPC ........................................ 455/436–440, 552.1
See application file for complete search history.

(56) References Cited

U.S. PATENT DOCUMENTS

| | | | |
|---|---|---|---|
| 5,987,334 A | 11/1999 | Kaku | |
| 7,245,913 B1 | 7/2007 | Nguyen et al. | |
| 7,433,929 B2 | 10/2008 | Guilford et al. | |
| 2002/0137514 A1* | 9/2002 | Mitsugi | H04B 1/0003 455/436 |
| 2004/0208160 A1* | 10/2004 | Petrovic et al. | 370/350 |
| 2004/0253984 A1* | 12/2004 | Csapo et al. | 455/561 |
| 2006/0030354 A1* | 2/2006 | Ho et al. | 455/552.1 |
| 2008/0130555 A1* | 6/2008 | Kalhan | 370/329 |
| 2009/0247164 A1* | 10/2009 | Kandukuri Narayan et al. | 455/436 |
| 2010/0248742 A1* | 9/2010 | Song et al. | 455/456.1 |
| 2010/0323696 A1* | 12/2010 | Cherian et al. | 455/435.2 |

* cited by examiner

*Primary Examiner* — Michael Faragalla
(74) *Attorney, Agent, or Firm* — Meyertons, Hood, Kivlin, Kowert & Goetzel, P.C.

(57) ABSTRACT

The quality of a wireless data connection is used to identify a suitable radio access network on which a wireless multi-mode device camps.

20 Claims, 7 Drawing Sheets

WIRELESS SYSTEM SELECTION BASED ON DATA CONNECTIVITY

TECHNICAL FIELD

The embodiments described herein relate generally to the field of wireless communication. In particular, the quality of a wireless data connection is used to identify a suitable radio access network on which a wireless multi-mode device camps.

BACKGROUND

Dual mode (or multimode) mobiles refer to mobile phones that are compatible with more than one form of data transmission or network, as contrasted with single-mode mobiles. For instance, a dual-mode phone can be a telephone which uses more than one technique for sending and receiving voice and data. The dual mode can refer to network compatibility, such as mobile phones containing two types of cellular radios for voice and data. These phones include combination of GSM and CDMA technology. They can be used as a GSM or CDMA phone according to user preference.

When a dual mode phone is started up, the most recently used (or MRU) communication technology will be the preferred choice of system on which the dual mode phone will camp. For example, in those cases with the MRU is a CDMA based network, then the dual mode phone will attempt to camp on an appropriate wireless network based primarily upon the success of the dual mode phone in establishing an acceptable voice connection, also referred to as a circuit switch or CS connection regardless of the ability to establish a suitable data connection also referred to as packet switched, or PS connection.

Until the recent rise in the popularity of smart devices such as the iPhone™ and iPad™ both manufactured by Apple Computer of Cupertino Calif., the priority of establishing the CS connection over the PS connection was eminently sensible given the relative importance of voice over data. However, with the increase in the number of smart phones and the concomitant increase in the need for data availability, the priority order between the CS connection and the PS connection has shifted to the point where in many cases establishing the PS connection is actually more important to the end user than the CS connection. This will become even more significant as the number and variety of smart devices increases as well as the increase in the sophistication and number of PS voice applications such as iChat™ or Facetime™ become ubiquitous. More than smart phones, data centric devices such as iPad™ can benefit from higher priority given to PS service than CS service. Smartphones will still want to prioritize CS service.

Therefore, a user transparent technique performed by a dual mode phone for prioritizing a PSconnection over a CSconnection is desired.

SUMMARY OF THE DESCRIBED EMBODIMENTS

Other apparatuses, methods, features and advantages of the described embodiments will be or will become apparent to one with skill in the art upon examination of the following figures and detailed description. It is intended that all such additional apparatuses, methods, features and advantages be included within this description be within the scope of and protected by the accompanying claims.

In one embodiment, a method is performed by a multi-mode communication device (MMD) for maintaining a wireless data connection at a minimum quality level such as data speed. The method can be carried out by performing at least the following operations by the MMD, establishing a communication channel with a first radio access network by the MMD, the communication channel including at least a data connection, determining if a quality of the data connection on the first RAN is acceptable, and establishing a data connection on a second RAN by the MMD when the quality of the data connection on the first RAN is not acceptable.

In one aspect of the described embodiment, the first radio access network is selected based upon a most recently used, or MRU. In another embodiment, the first radio access network is selected based upon polling information stored in the multi-mode communication device that identifies near-by wireless systems based upon their proximity to the mobile device and their respective data connectivity characteristics. Using the near-by wireless system polling information, the dual mode mobile device camps on that wireless system having the highest quality of data connectivity compared to all other available wireless networks.

In another embodiment, a multi-mode device (MMD) is described. The MMD includes at least a first wireless interface arranged to establish a communication channel between the MMD and a first radio access network (RAN) based upon a first radio access technology (RAT), a second wireless interface arranged to establish a communication channel between the MMD and a second radio access network (RAN) based upon a second radio access technology (RAT), a memory store arranged to store at least instructions used to execute control logic, and a processor arranged to access the instructions in the memory store and execute the control logic. In the described embodiment, the control logic causes the MMD to activate the first wireless interface to establish a communication channel with the first RAN using, the communication channel including at least a data connection, determine if a quality of the data connection on the first RAN is acceptable, activate the second wireless interface if the quality of the data connection is not acceptable, establish a data connection on the second RAN, and deactivate the first wireless interface.

In yet another embodiment, an apparatus is described. The apparatus includes at least means for establishing a communication channel with a first radio access network, the communication channel including at least a data connection, means for determining if a quality of the data connection on the first RAN is acceptable, and means for establishing a data connection on a second RAN by the MMD when the quality of the data connection on the first RAN is not acceptable.

Non-transitory computer readable medium for storing computer code executable by a processor in a multi-mode communication device (MMD) is also described. The non-transitory computer readable medium includes at least computer code for establishing a communication channel with a first radio access network by the MMD, the communication channel including at least a data connection, computer code for determining if a quality of the data connection on the first RAN is acceptable, and computer code for establishing a data connection on a second RAN by the MMD when the quality of the data connection on the first RAN is not acceptable.

BRIEF DESCRIPTION OF THE DRAWINGS

The described embodiments and the advantages thereof can best be understood by reference to the following description taken in conjunction with the accompanying drawings.

DETAILED DESCRIPTION OF REPRESENTATIVE EMBODIMENTS

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Multi-mode mobiles (also referred to as global mobiles) refer to mobile phones that are compatible with more than one form of data transmission technology or network. Typically, dual mode mobile phones contain at least two types of cellular radios for voice and data. For example, dual mode phones can include combination of UMTS (or GSM) and CDMA technology and can be used according to user data connectivity preference. A UMTS communications network can carry many traffic types from real-time circuit switched (CS) to IP based packet switched (PS). It should be noted that the designation "1×" (meaning 1 times Radio Transmission Technology) relies upon a duplex pair of 1.25 MHz radio channels capable of supporting packet data speeds of up to 153 kbps. CDMA2000 1×EV-DO (Evolution-Data Optimized), often abbreviated as EV-DO or EV, is a telecommunications standard for the wireless transmission of data through radio signals, typically for broadband Internet access that uses multiplexing techniques including code division multiple access (CDMA) as well as time division multiple access (TDMA) to maximize both individual user's throughput and the overall system throughput. 3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

These and other embodiments are discussed below with reference to FIGS. 1-7. However, those skilled in the art will readily appreciate that the detailed description given herein with respect to these figures is for explanatory purposes only and should not be construed as limiting.

Figure 1:
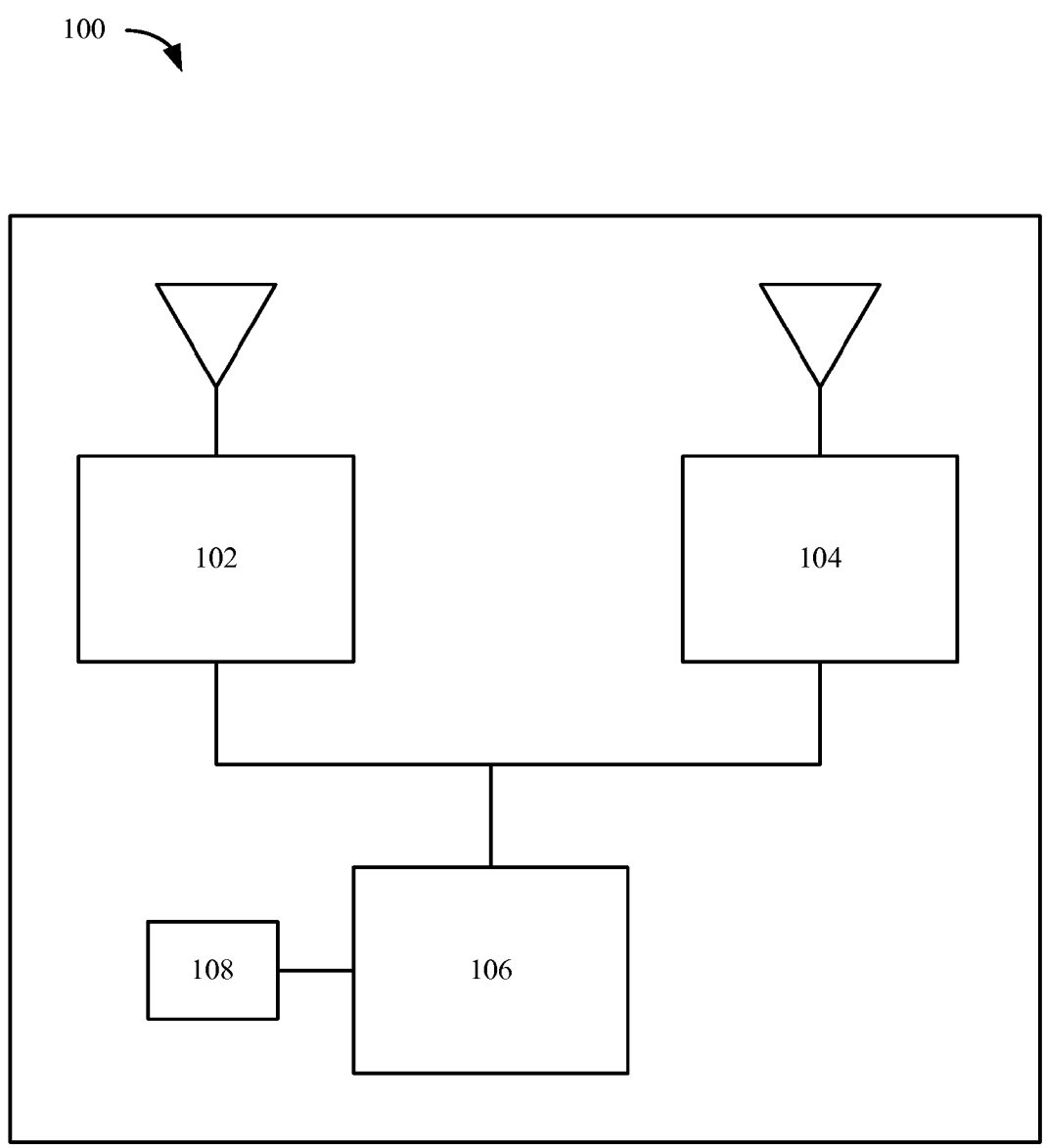
FIG. 1 is a block diagram illustrating representative multi-mode device.

FIG. 1 is a block diagram illustrating representative multi-mode device 100. Multi-mode device 100 can include at least first wireless interface 102 and second wireless interface 104. First wireless interface 102 can further include a wireless transceiver configured to send and receive signals using a first radio access technology, or RAT. Second wireless interface 104 can also a wireless transceiver configured to send and receive signals using a second RAT. For example, first wireless interface 102 can be a cellular communication interface arranged to communicate using a UMTS. Second wireless interface 104 can also be a cellular communication interface arranged to communicate using CDMA. It should be noted, however, that multi-mode device 100 is illustrated in FIG. 1 having two wireless interfaces, and however, this should not be construed to limiting the principles described herein to multi-mode devices with only two interfaces as two interfaces are used merely for ease of illustration. Those skilled in the art should readily appreciate that multi-mode device 100 may suitably comprise any physically realizable number of wireless interfaces for servicing any number of radio access technologies.

Multi-mode device 100 can also include control logic 106. "Logic," as used herein, includes but is not limited to hardware, firmware, software, and/or combinations of each to perform a function(s) or an action(s) and/or to cause a function or action from another component. For example, based on a desired application or need, logic may include a software controlled microprocessor, discreet logic such as an application specific integrated circuit (ASIC), a programmable/programmed logic device, memory device containing instructions or the like, or combinational logic embodied in hardware. Logic may also be fully embodied as software. Accordingly, control logic 106 can be in communication with first wireless interface 102 as well as second wireless interface 104. Control logic 106 can be configured to control the operation of first wireless interface 102 and second wireless interface 104. For example, control logic 106 can switch off the power to either first interface 102 and/or second wireless device 104 based on pre-defined criteria. For example, if first wireless interface 102 uses more power than second wireless interface 104, control logic 106 may be configured to use second wireless interface 104 when available and, in some embodiments, switch off the power to first wireless interface 102 while communicating using second wireless interface 104. Control logic 106 can also activate first wireless interface 102 and deactivate (or put in an inactive state, or sleep mode) second wireless interface and vice versa. For example, when multi-mode device 100 has established a communication channel with a first RAT network (such as UMTS), then control logic 106 can deactive some or all of second wireless interface 104. It should be noted, however, that in some embodiments, portions of second wireless interface 104 can remain at least partially active in order to perform various background operations. Such background operations can include, for example, monitoring that status of available networks compatible with the radio access technology practiced by second wireless interface 104. In this way, by periodically polling the status of surrounding wireless networks, control logic 106 can monitor a current data connectivity status of the active wireless interface and if the quality of the current data connection drops below a threshold, then control logic 106 can use the polling information to activate the other wireless interface and switch to another communication network having a higher quality data connection using the same radio access technology or switching to a radio access network that uses another radio access technology.

Furthermore, control logic 106 can be responsive to signals received either first wireless interface 102 and/or second wireless interface 104 to activate or deactivate one of first wireless interface 102 and/or second wireless interface 104. For example, control logic 106 may receive a signal on first wireless interface 102 to activate second wireless interface 104. As another example, control logic 106 can receive a signal on first wireless interface 102 to deactivate second wireless interface 104. Optionally, control logic 106 can close any activate network connections associated with second wireless interface 104 before deactivating second wireless interface 104. Similarly, control logic 106 can receive a signal on second wireless interface 104 to activate or deactivate first wireless interface 102. Deactivating a wireless interface may suitably be one of turning off power to the wireless interface or switching the wireless interface into a lower power (e.g. Sleep mode or power save) state.

Multi-mode device 100 can also include user interface 108. User interface 108 can be coupled to control logic 106. User interface 108 can be employed to receive data to override a particular setting. User interface 108 can include button, keypad, touch screen, or other device capable of receiving data from an associated user. For example, even though control logic 106 has received data and/or instructions to shut off second wireless interface 104, user interface 108 can receive data and/or instructions to power on second wireless interface 104.

In order to determine whether wireless interface 102 or wireless interface 104 is active, a determination is made which wireless interface can provide a highest quality of data connection. In one aspect of the described embodiments, the quality of data connection can be related to available data bandwidth, highest available data speed, the availability of a data connection, and so forth. For example, if wireless interface 102 is not able to establish a data connection with a wireless network, then a no data connection trigger can cause control logic 106 to search wireless interface 104 to search for an appropriate radio access network on which to camp that can provide the requisite data connection. This situation also applies to wireless interface 104 with respect to wireless interface 102. For example, in the case of a UMTS/GSM network, when wireless interface 102 (or 104) attempts to establish a data connection but fails, then MMD 100 can receive a rejection of packet service along the lines shown in Table. 1. Table 2 on the other hand shows reject causes of CDMA 2000 1x/EvDo networks.

TABLE 1

| Reject cause | Description | Layer |
|---|---|---|
| 7 | GPRS services not allowed | GPRS Mobile Management (UMTS/GSM NAS) |
| 9 | MS identity cannot be derived by the network | GPRS Mobile Management (UMTS/GSM NAS) |
| 14 | GPRS services not allowed in this PLMN | GPRS Mobile Management (UMTS/GSM NAS) |
| 29 | User authentication failed | GPRS Session Management (UMTS/GSM NAS) |

TABLE 2

| Reject cause | Description | Layer |
|---|---|---|
| 67 | Foreign Agent mobile node authentication failed | Mobile IP procedure in Point to Point Protocol |
| 131 | Home Agent mobile node authentication failed | Mobile IP procedure in Point to Point Protocol |

In order to distinguish the quality of service between available wireless networks, a difference in data connection quality can be related to a threshold value. If the difference in data connection quality between two different wireless networks of the same RAT or different RAT is greater than the threshold value, then control logic 106 switches control from the network of lower quality to that of higher quality. For example, the threshold value can be defined by a given amount that can be, for example, 10% of the current bit rate of a first radio access network. That is, in this case the condition for a second radio access network supporting the requested service than the first radio access network is the condition that the bit rate is at least 10% higher. In this case, control logic 106 would perform a seamless transition from one wireless interface to the other wireless interface by, for example, maintaining a transition period during which both wireless interfaces are active and only de-activating one wireless interface after the other wireless interface has successfully camped on an appropriate wireless network and established a valid communication channel (including both voice and/or data).

Figure 2:
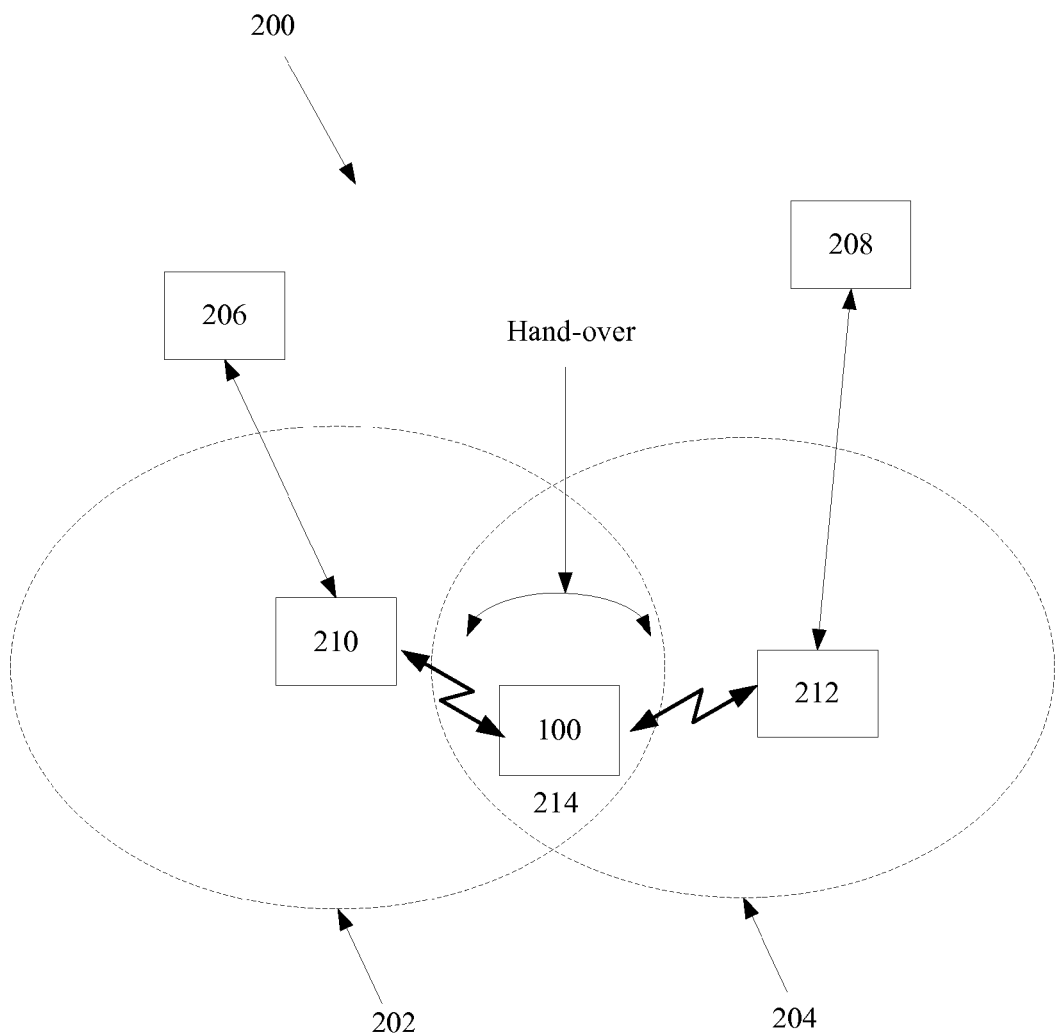
FIG. 2 shows general wireless network (NW) in accordance with the described embodiments.

FIG. 2 shows general wireless network (NW) 200 in accordance with the described embodiments. Network 200 can include at least two radio access networks based upon different radio access technologies. For example, radio access network (RAN) 202 can operate using UMTS radio access technology whereas RAN 204 can operate using CDMA radio access technology. In any case, each RAN can include at least one base station controller (BSC). For example, RAN 202 can use BSC 206 to communicate with MMD 100 by way of cell 210 whereas RAN 204 can use BSC 208 to communicate with MMD 100 by way of cell 212. Cells 210 and 212 can have overlapped region 214 in which the RAN 202 and the RAN 204 can both be accessed. Therefore, for the purpose of following discussion, it is assumed that a MMD 100 is located in overlapped region 214 and that MMD 100 is capable of communicating with both radio access networks. That is, MMD 100 is adapted to both radio access networks and is present in the same coverage area. In principle, the described embodiments can be implemented by either MMD 100 or a network controlling device.

Figure 3:
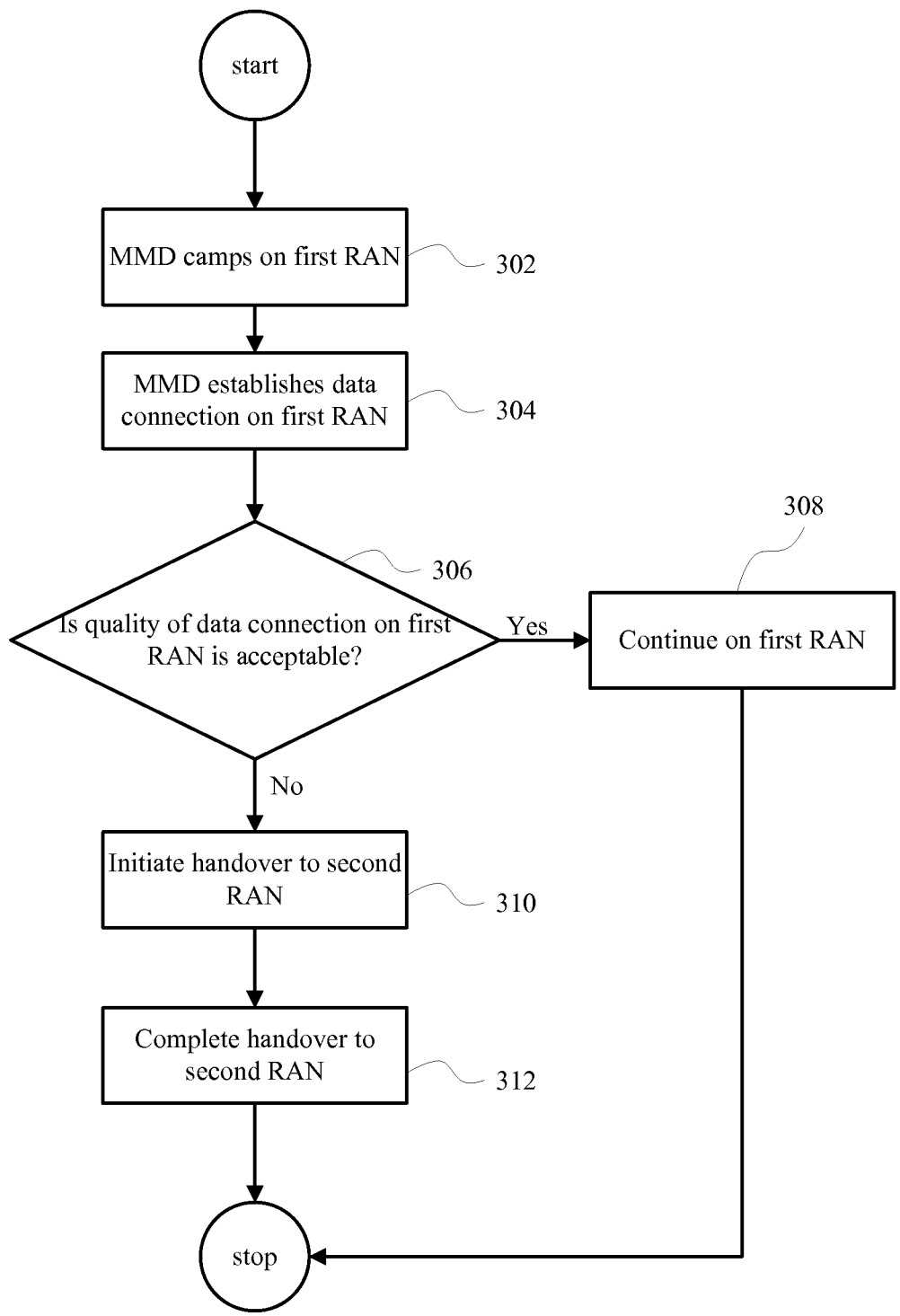
FIG. 3 shows a flowchart detailing process in accordance with the described embodiments.

FIG. 3 shows a flowchart detailing process 300 in accordance with the described embodiments. At 302, MMD 100 camps on a first candidate RAN. The first candidate RAN can be determined by, for example, querying a most recently used, or MRU, radio access network. By most recently used, it is meant that the most recent RAN is the most likely RAN to be able to provide the services required by MMD 100. For example, if the MRU RAN is a CDMA network, then MMD will first search for and camp on a nearby CDMA network. On the other hand, if the MRU RAN is a GSM network, MMD 100 will search for and camp on a nearby GSM network. Once MMD 100 has camped on a RAN, MMD 100 can generate a service request at 304. For example, the service request can be related to a minimum data download speed. In this case, MMD 100 can use the service request to analyze and compare the capabilities of the RAN currently used by the MMD 100 at 306. For example, the analysis could be performed by comparing the service request with a set of services available in the first candidate RAN. The list of available services can be stored in a table or the like available on MMD 100. If it is determined that the service request can be supported by the first candidate RAN on which MMD is camped, then control is passed to 308 where normal processing of the service request within the current RAN is performed.

On the other hand, if it is determined at 306 that the requested service is not supported by the current RAN or do not meet certain requirements, such as a minimum data download speed, then at 310 a handover to a second RAN is initiated and completed at 312. In the described embodiment, the handover can be accomplished in complete transparency to the end user. For example, if during a data download operation the current bit rate drops below an acceptable minimum value, then the handover can occur by activating circuitry within MMD 100 used to support the second RAN while maintaining the connection by the first RAN. The circuitry within MMD used to support first RAN can be de-activated, or at least portions thereof, when it is confirmed that the data connection in the second RAN is secure.

Figure 4:
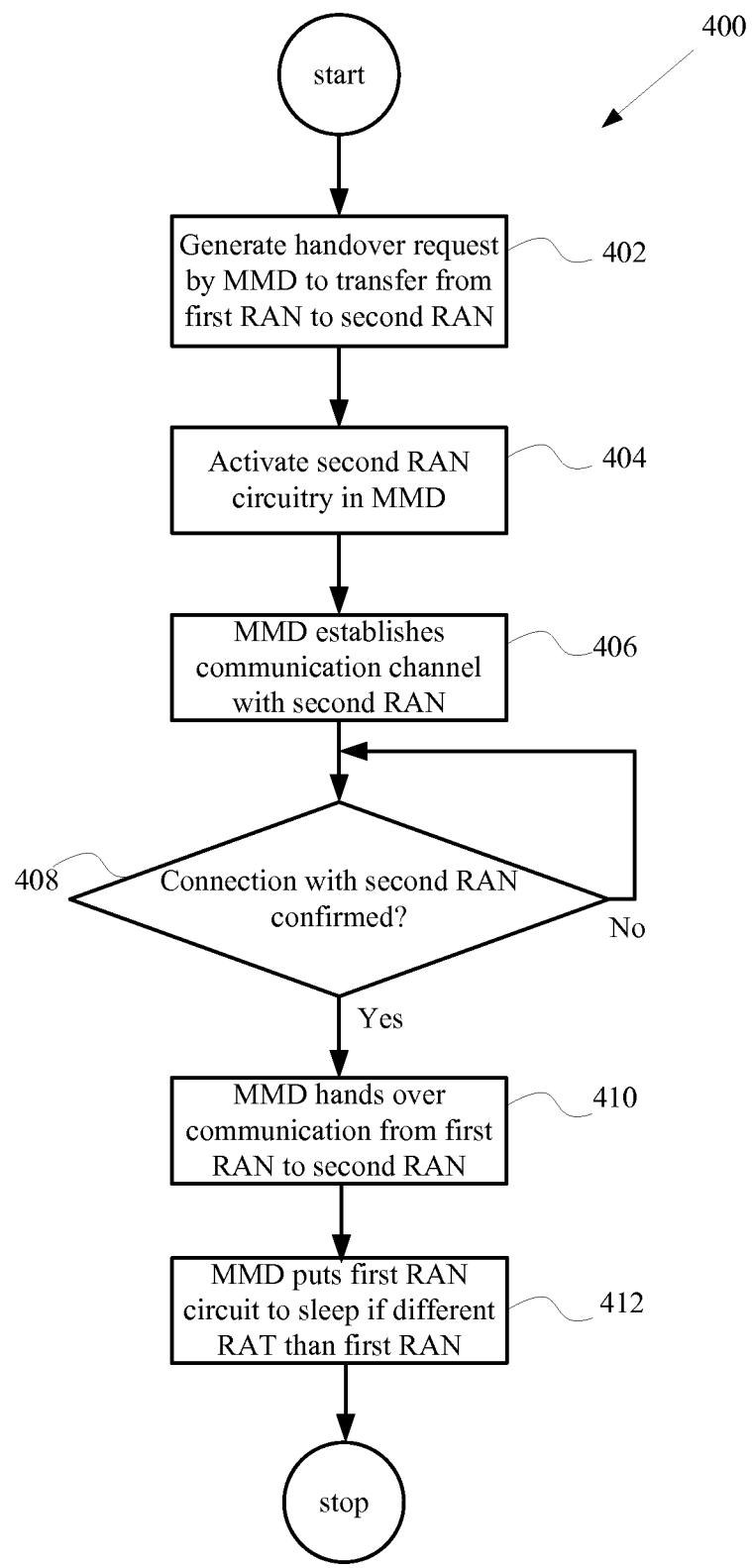
FIG. 4 shows a flowchart detailing handover process in accordance with the described embodiments.

More particularly, FIG. 4 shows a flowchart detailing handover process 400 in accordance with the described embodiments. Handover process 400 can begin at 402 generating a handover request by MMD 100. The handover request can be used to transfer the wireless connection between MMD 100 and RAN 202 to RAN 204, for example. The reasons for the handover can be widely varied. For example, if the data connectivity of RAN 202 is determined to be less than a pre-determined value, then MMD 100 can generate the handover request. Once the handover request is generated, a processor in MMD 100 can use the handover request to activate at least portions of circuitry used to support wireless communication with RAN 204 in preparation for the actual handing over operation at 404. It should be noted that in order to provide a seamless a transition as possible to the end-user, the circuitry within MMD 100 used to support RAN 202 remains active and supporting the current data connection between MMD 100 and RAN 202. Once the circuitry in MMD 100 used to support RAN 204 is active, then MMD 100 establishes a connection between MMD 100 and RAN 204 at 406. Once the connection between RAN 204 and MMD 100 is confirmed at 408, then MMD 100 establishes a communication channel with RAN 204 which time MMD 100 hands over the communication from RAN 202 to RAN 204 at 410 and deactivates circuitry used to support RAN 202 at 412. In this way, by providing a seamless handover, the end user of MMD 100 is not aware that MMD 100 has changed operational wireless networks.

Figure 5:
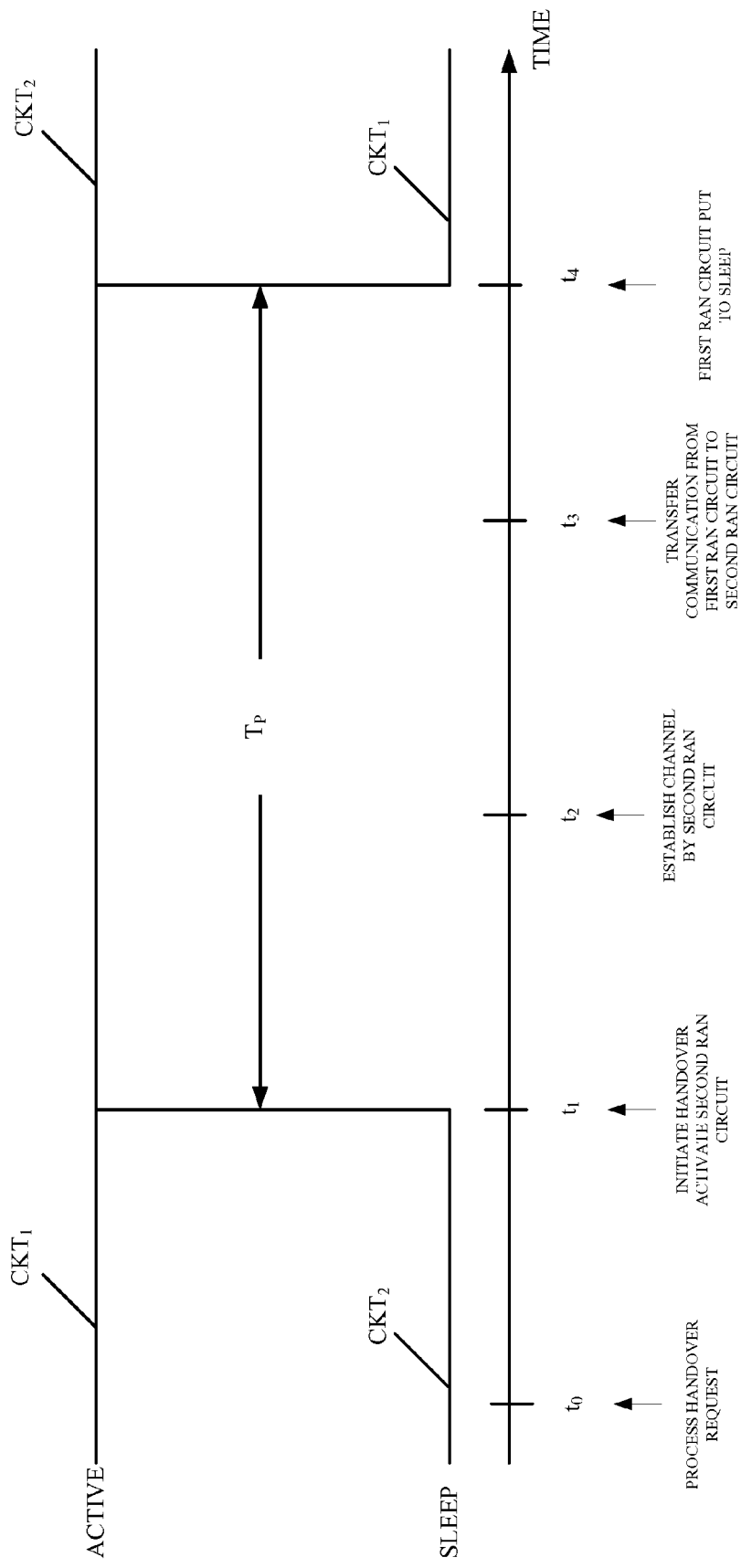
FIG. 5 shows representative handover timing diagram for wireless circuitry included in MMD.

FIG. 5 shows representative handover timing diagram for wireless circuitry included in MMD 100. In particular, at time $t_0$, a handover request is processed. The handover request can result from any number of factors. For example, MMD 100 can camp on a first candidate RAN based upon a most recently used, or MRU. In other words, if the most recent RAN is CDMA based, for example, then MMD 100 will attempt to camp on a nearby CDMA RAN. In other situations, MMD 100 can be actively transferring data on a first RAN that can then experience a drop in data transfer quality, such as speed below a threshold value. In this case, the handover request can be processed in order to improve or at least maintain a minimum quality of service. Once the handover request is generated, the processor in MMD 100 activates the circuitry used to support the second radio access network at $t_1$ initating transition period $T_P$. It should be noted that during transition period $T_P$, the amount of power consumed by MMD 100 can be higher than normal due to the fact that at least two radio access circuits are active. Therefore, in order to not overtax the battery resources of MMD 100, a timer can be set to de-active the radio access circuitry in MMD 100 used to access the second radio access network if after a pre-determined amount of time a connection with the second radio access network cannot be effectuated. In any case, at $t_2$, a communication channel can be established between MMD 100 and the second radio access network. Once the communication channel is confirmed as being capable of meeting the required quality requirements, then the handover procedure causes MMD 100 to transfer communication from the first radio access network to the second radio access network at $t_3$. Once the handover process is complete, then MMD 100 can de-activate circuitry used to support the first radio access network at $t_5$ thereby ending the handover process.

Figure 6:
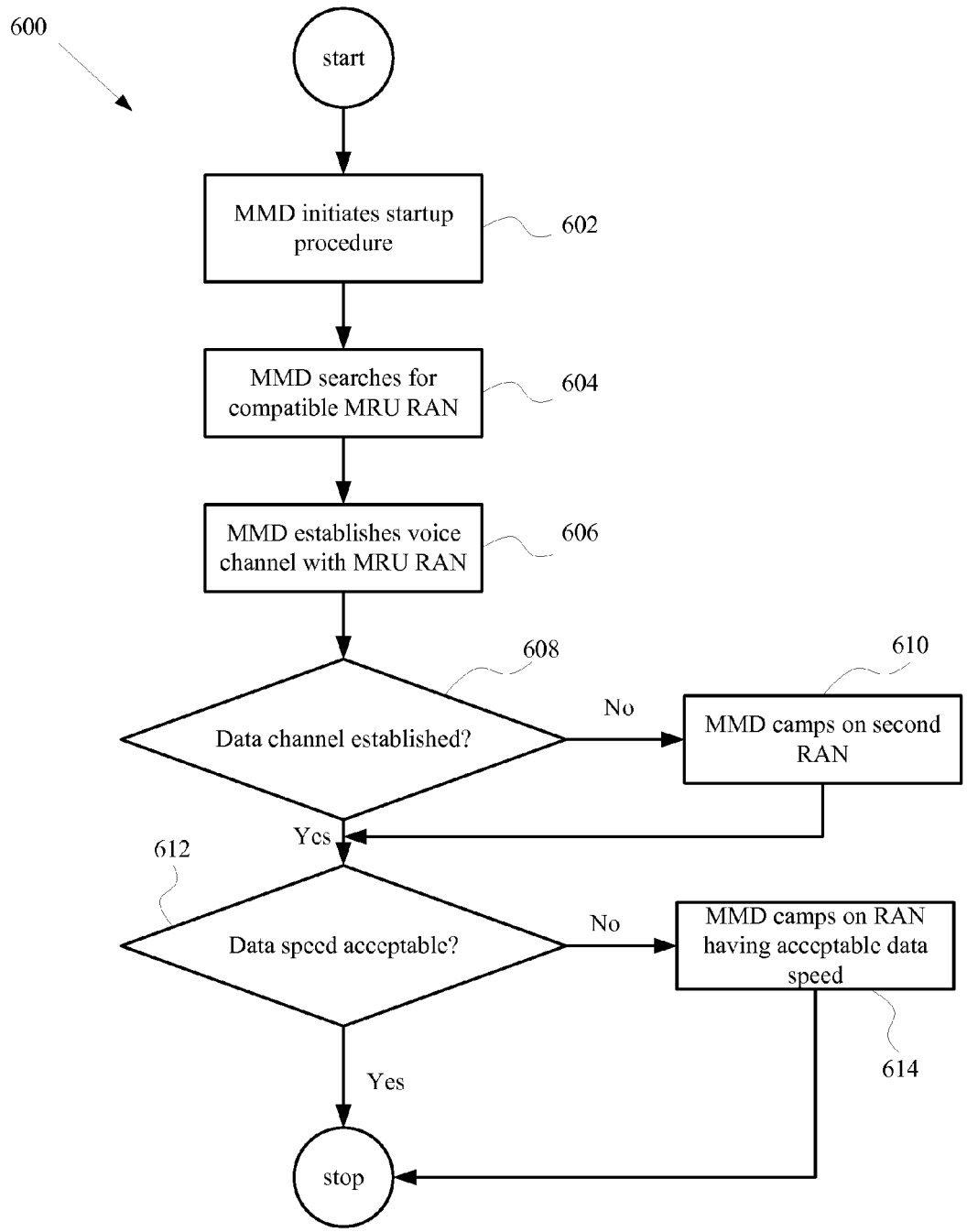
FIG. 6 shows a flowchart detailing process describing a specific implementation of the described embodiments.

FIG. 6 shows a flowchart detailing process 600 describing a specific implementation of the described embodiments. In particular, process 600 describes a situation where a multimode device camps on a first candidate radio access network based upon a most recently used (MRU). In this case, the most recently used radio access network uses a radio access technology based upon CDMA 1×. Accordingly, process 600 begins at 602 by the MMD initiating a startup procedure that includes at least querying an internal database to determine the most recently used RAN, which in this case happens to be based upon CDMA 1× radio access technology. At 604, the MMD searches for a compatible near-by radio access network. Once the MMD identifies a compatible RAN, the MMD camps on the RAN and establishes a voice channel at 606. Once the voice channel has been successfully established, the MMD attempts to establish a data channel at 608. If the attempt to establish the data channel is successful, then the speed of the data channel is checked against a predetermined data channel speed threshold value. In some cases, an end user of the MMD can select a default mode whereby once the voice and data channel is established, no further evaluation is needed as the end user has determined that having an established voice channel is a priority over having a data channel with a minimum data speed. In some cases, the end user may not desire a data channel at all in which case, the establishment of the voice channel is sufficient. On the other hand, if the data channel is not established then control is passed to 810 for camping on a second RAN.

In any case, if it is determined at 608 that the data speed of the CDMA 1×RAN is not sufficient to satisfy the predetermined condition, then at 812, the MMD camps on a radio access network having a higher data speed is available. This determination can be based upon searching for a RAN based upon CDMA EVDO, for example, if it is determined that this RAT will satisfy the minimum data speed threshold. In most cases, however, the MMD will attempt to camp on a RAN that utilizes an inherently faster radio access technology, such as UMTS or GSM. In this case, the MMD will activate a UMTS/GMS circuit and camp on the UMTS/GSM RAN. Once the MMD has successfully established a communication link with the second RAN, the MMD will confirm that the data speed is acceptable and if not, then an attempt to search for a RAN having higher data rates is performed. For example, if the MMD camps on a RAN that only supports EDGE, then an attempt is made to search for and camp on RAN that support either UMTS or GSM.

Figure 7:
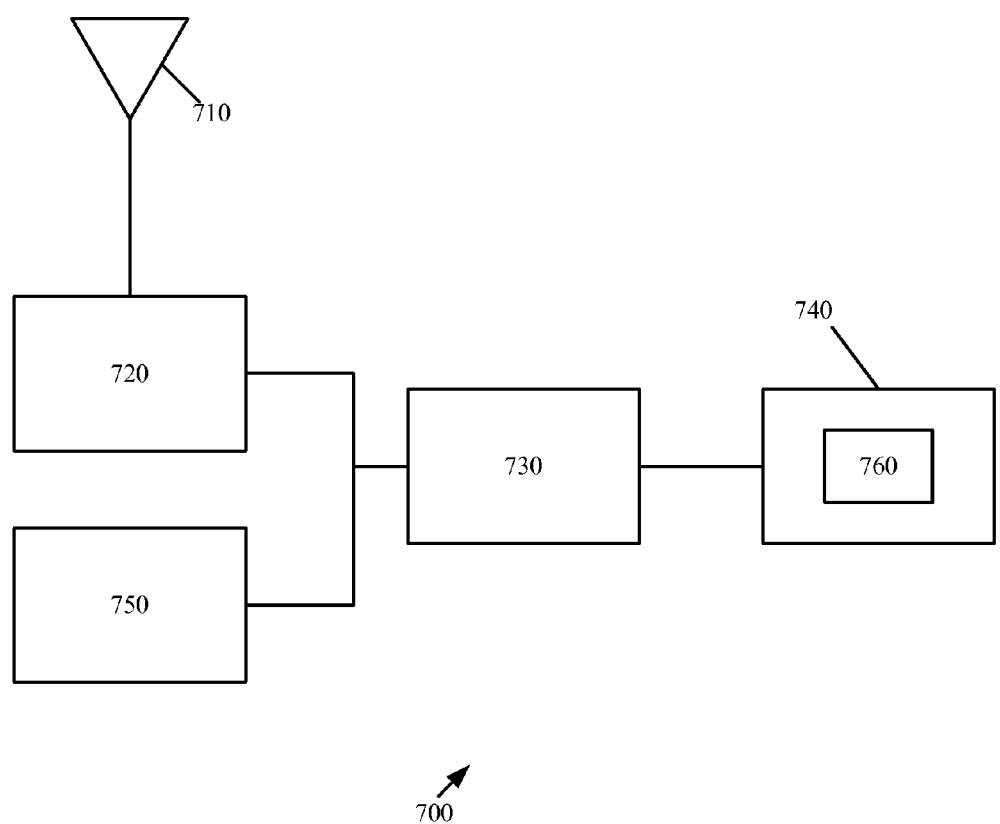
FIG. 7 shows a representative mobile system in accordance with the described embodiments.

FIG. 7 shows an embodiment of mobile unit 700. For clarity, only a subset of the components is shown. Signals are received at antenna 710, and delivered to receiver 720 where amplification, down-conversion, sampling, and demodulating takes place. Various techniques for receiving CDMA and or GSM signals are known in the art. Receiver 720 is in communication with a central processing unit (CPU) 730. CPU 730 may be a microprocessor or digital signal processor (DSP), or one of various processors known in the art. CPU 730 communicates with memory 740, which is shown containing roaming list 760. The roaming list 760 can be programmed via over-the-air programming in conjunction with antenna 710 and receiver 720, or the data for the roaming list may come in from other inputs to CPU 730 (not shown). CPU 730 is also connected to transmitter 750, for transmitting messages, data, voice, etc., using any of the techniques for transmission known in the art. Transmitter 750 is connected to antenna 710, for transmission to a base station, such as base station 104. Receiver 720 and transmitter 750, in conjunction with antenna 710, can be used to communicate with one or more systems identified in the roaming list 760 when the mobile station is roaming.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The embodiments were chosen and described in order to best explain the underlying principles and concepts and practical applications, to thereby enable others skilled in the art to best utilize the various embodiments with various modifications as are suited to the particular use contemplated. It is intended that the scope of the embodiments be defined by the following claims and their equivalents.

What is claimed is:

1. A method performed by a multi-mode communication device (MMD), comprising:
    establishing a communication channel with a first radio access network (RAN) by the MMD, the communication channel including at least a voice connection, wherein the first RAN operates according to a first radio access technology (RAT);
    establishing a first data connection with the first RAN, wherein the first data connection is separate from the voice connection;
    determining a quality of the first data connection on the first RAN, wherein determining the quality of the first data connection comprises comparing a speed of the first data connection to a pre-determined data channel speed threshold value;
    determining a second RAT that transfers data at a faster speed than the first RAT;
    searching for a second RAN that operates according to the second RAT during a background operation by periodically polling a status of the second RAN while the first data connection is active; and
    establishing a second data connection on the second RAN by the MMD when the speed of the first data connection on the first RAN falls below the pre-determined data channel speed threshold value.

2. The method as recited in claim 1, wherein the searching for the second RAN uses information stored in the MMD.

3. The method as recited in claim 2, wherein the information stored in the MMD used to search for the second RAN is polling information gathered by the MMD.

4. The method as recited in claim 1, wherein the second RAT is related to the first RAT.

5. The method as recited in claim 4, wherein the first RAT is GSM and wherein the second RAT is UMTS.

6. The method as recited in claim 4, wherein the first RAT is CDMA2000 1× and wherein the second RAT is CDMA2000 1×EV-DO.

7. A multi-mode device (MMD), comprising:
    a first wireless interface arranged to establish a first communication channel between the MMD and a first radio access network (RAN) based upon a first radio access technology (RAT);
    a second wireless interface arranged to establish a second communication channel between the MMD and a second radio access network (RAN) based upon a second radio access technology (RAT);
    a memory store arranged to store at least instructions used to execute control logic; and
    a processor arranged to access the instructions in the memory store and execute the control logic, the control logic configured to cause the MMD to:
        activate the first wireless interface to establish the first communication channel with the first RAN, the first communication channel comprising at least a voice connection;
        establish a first data connection with the first RAN, wherein the first data connection is separate from the voice connection;
        determining that a data transfer speed of the second RAT is faster than that of the first RAT;
        search for the second RAN during a background operation by periodically taking a poll of the second RAN while the first communication channel is active;
        determine a quality of the data connection on the first RAN, wherein the quality of the first RAN includes a speed of the data connection on the first RAN;
        when the speed of the data connection falls below a data connection speed threshold, activate the second wireless interface;
        establish the second communication channel on the second RAN, the second communication channel comprising at least a second data connection;
        determine a quality of the second data connection, wherein the quality of the second data connection includes a speed of the second data connection on the second RAN;

compare the speed of the first data connection to the speed of the second data connection; and in response to the comparison, deactivate the first wireless interface.

8. The MMD as recited in claim 7, the control logic further configured to cause the MMD to identify the second RAN using information stored in the memory store.

9. The MMD as recited in claim 8, wherein the information stored in the memory stores used to identify the second RAN is polling information gathered by the MMD.

10. The MMD as recited in claim 7, wherein the second RAT is related to the first RAT.

11. The MMD as recited in claim 10, wherein the first RAT is GSM and wherein the second RAT is UMTS.

12. The MMD as recited in claim 10, wherein the first RAT is CDMA2000 1× and wherein the second RAT is CDMA2000 1×EV-DO.

13. A multi-mode device (MMD), comprising:
means for establishing a communication channel with a first radio access network (RAN), the communication channel including at least a voice connection, wherein the first RAN operates according to a first radio access technology (RAT);
means for establishing a first data connection with the first RAN, wherein the first data connection is separate from the voice connection;
means for determining a quality of the first data connection on the first RAN, wherein determining the quality of the first data connection comprises comparing a speed of the first data connection to a pre-determined data channel speed threshold;
determining a second RAT that transfers data at a faster speed than the first RAT;
means for searching for a second RAN that operates according to the second RAT during a background operation comprising means for periodically polling the second RAN while the communication channel is active; and
means for establishing a second data connection on the second RAN by the MMD when the speed of the first data connection on the first RAN falls below the pre-determined data channel speed threshold.

14. The apparatus as recited in claim 13, further comprising:
means for activating a communication circuit in the MMD used to support the second RAN when it is determined that the speed of the first data connection on the first RAN falls below the pre-determined data channel speed threshold;
means for using information stored in the MMD to search for the second RAN; and
means for deactivating a communication circuit in the MMD used to support the first RAN when the second data connection on the second RAN is established.

15. The apparatus as recited in claim 14, wherein the information stored in the MMD used to search for the second RAN is polling information gathered by the MMD.

16. The apparatus as recited in claim 13, wherein the second RAT is related to the first RAT.

17. Non-transitory computer readable medium for storing computer code executable by a processor in a multi-mode communication device (MMD), the computer readable medium comprising:
computer code for establishing a communication channel with a first radio access network (RAN) by the MMD, the communication channel including at least a voice connection, wherein the first RAN operates according to a first radio access technology (RAT);
computer code for establishing a first data connection with the first RAN, wherein the first data connection is separate from the voice connection;
computer code for determining a quality of the data connection on the first RAN, wherein determining the quality of the first data connection comprises comparing a speed of the first data connection to a data channel speed threshold value;
computer code for determining a second RAT that transfers data at a faster speed than the first RAT;
computer code for searching for a second RAN that operates according to the second RAT by the MMD during a background operation by periodically polling the second RAN; and
computer code for determining a quality of a second data connection on the second RAN, wherein determining the quality of the second data connection comprises determining a speed of the second data connection;
computer code for comparing the speed of the first data connection to the speed of the second data connection; and
computer code for establishing a data connection on the second RAN by the MMD based, at least in part, on the comparing.

18. The computer readable medium as recited in claim 17, further comprising:
computer code for activating a communication circuit in the MMD used to support the second RAN when it is determined that the speed of the first data connection on the first RAN falls below the data channel speed threshold value;
computer code for using information stored in the MMD to search for the second RAN; and
computer code for deactivating a communication circuit in the MMD used to support the first RAN when the second data connection on the second RAN is established.

19. The computer readable medium as recited in claim 18, wherein the information stored in the MMD used to search for the second RAN is polling information gathered by the MMD.

20. The method as recited in claim 2, further comprising:
deactivating a communication circuit in the MMD used to support the first RAN when the second data connection on the second RAN is established.

* * * * *